March 12, 1968     R. T. FULTON     3,372,781
REVERSIBLE FRICTION DRIVE DEVICE
Filed Jan. 6, 1966
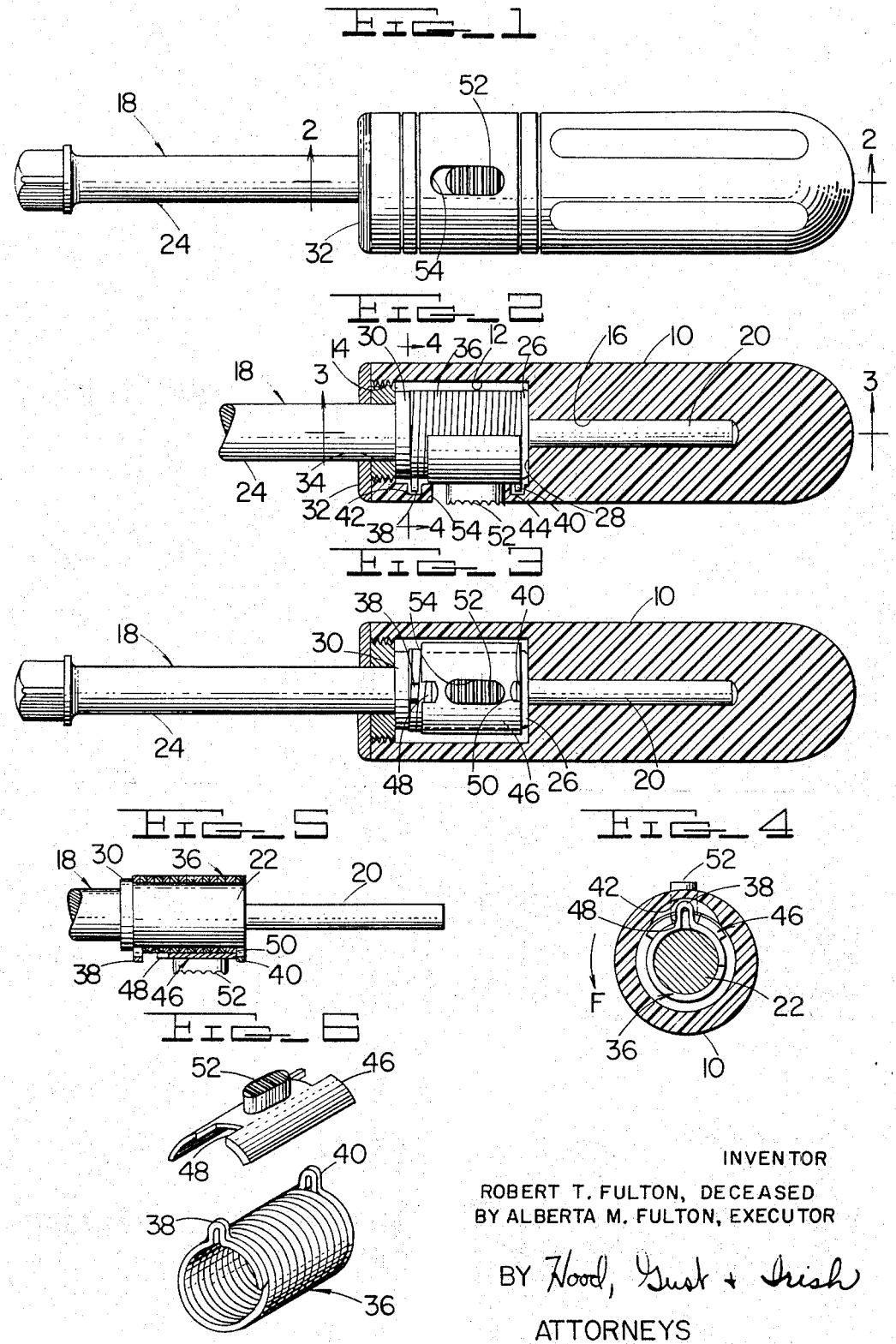
INVENTOR
ROBERT T. FULTON, DECEASED
BY ALBERTA M. FULTON, EXECUTOR
BY *Wood, Gust & Irish*
ATTORNEYS

United States Patent Office 3,372,781
Patented Mar. 12, 1968

3,372,781
REVERSIBLE FRICTION DRIVE DEVICE
Robert T. Fulton, deceased, late of Logansport, Ind., by Alberta M. Fulton, executor, Logansport, Ind., assignor of one-third to Standard Fiscal, Inc., and one-third to Carolyn S. Fulton, Logansport, Ind.
Filed Jan. 6, 1966, Ser. No. 519,180
8 Claims. (Cl. 192—43)

ABSTRACT OF THE DISCLOSURE

A reversible friction drive device having a support and a drive member mounted for rotation therein. A helical spring is positioned between the support and the drive member, and is coaxial of the drive member. The spring is slidable with respect to both the support and the drive member. The support and the spring have detent means thereon adjacent to the opposite ends of the spring for urging the spring into frictional engagement with the drive member upon rotational movement therebetween. The spring fits the drive member in a manner such that when one end of the spring is held against relative rotational movement with respect to the support, the spring holds the drive member against rotation in one direction but permits rotation in the other direction. The support has reversing means mounted thereon for selectively holding the opposite ends of the spring against movement therebetween whereby the direction in which the spring holds the drive member against rotation relative to the support can be selected as desired.

---

The present invention relates to a reversible friction drive device and more particularly to a manually operable, reversible tool, such as a wrench, screwdriver and the like.

Reversible ratchet screwdrivers and wrenches are well known and convenient tools. Such tools ordinarily employ ratchet wheels and pawl devices whereby the rotatable shank may be selectively rotated in one direction by oscillatory, opposite rotational movement of the tool handle.

The present invention provides a reversible tool similar in operation to the aforementioned reversible ratchet tools; however, unlike the prior art devices, this invention does not depend for its operation upon engagement of a pawl with a series of ratchet teeth, but instead makes use of a smooth friction-type engagement which can effect rotation of the tool shank from almost any rotational position which does not depend upon the coinciding of a pawl with a ratchet tooth.

It is therefore an object of this invention to provide a reversible tool which utilizes a friction drive for effecting alternative rotation of a tool shaft in response to rotation of a handle which serves as a mounting for the shaft.

It is another object of this invention to provide a unique friction-driving mechanism whereby reversible operation of a tool shaft may be effected by the simplest manipulation of the handle supporting the shaft.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view of an embodiment of this invention;

FIG. 2 is a fragmentary sectional illustration taken substantially along section line 2—2 of FIG. 1;

FIG. 3 is a fragmentary sectional illustration taken substantially along section line 3—3 of FIG. 2;

FIG. 4 is a cross-section taken substantially along section line 4—4 of FIG. 2;

FIG. 5 is a fragmentary view of the cylindrical member and shaft portions of the tool of the preceding figs with the friction drive spring thereon shown in cross-section; and FIG. 6 is an exploded view of the friction spring and slider which coact in obtaining selectively reversible rotation of the tool shaft of FIG. 5.

Referring to the drawings, and more particularly to FIGS. 1 through 4, a cylindrically shaped handle or support 10 has a uniform diameter, coaxial socket 12 therein provided with end threads 14. An elongated bore 16 in the handle 10 coaxially extends from the socket 12.

A tool shaft generally indicated by the numeral 18 has a relatively small diameter, end portion 20 journaled in the bore 16, an enlarged cylindrical portion or drive member 22 positioned within the socket 12, and a shank 24 which extends from the end of handle 10 as shown. A washer 26 on the shaft portion 20 is interposed between the end wall 28 of the socket 12 and the right-hand end of the cylindrical portion 22 as shown more clearly in FIGS. 2 and 3. An integral collar 30 is provided on the left-hand end of the cylindrical portion 22 as shown. A plug 32 threads into the end of the socket 12 and just clears the collar 30 so as to hold the shaft 18 against endwise movement. The cap 32 is provided with an internal bore 34 in which the shank 24 is journaled. The structure thus far described permits the shaft 18 to rotate inside the handle 10 and secures the shaft against endwise movement.

Surrounding the cylindrical portion 22 is a helical spring, generally indicated by the numeral 36, this spring being of uniform inner and outer diameter and close-wound. Also, this spring is formed of conventional spring wire which is preferably square in cross-section as is more clearly shown in FIG. 5.

The opposite end coils of the spring 36 are provided with detent means in the form of two radially outwardly projecting lugs or detents 38 and 40, respectively, which are bent from the wire which forms the spring. These detents 38, 40 are in axial alignment and preferably are of the same size and shape.

The spring 36 snugly but slidably surrounds the cylindrical portion 22 of the shaft 18. Also, the length of the spring 36 substantially coincides with the length of the cylindrical portion 22.

The spring 36 fits inside the socket 12 with some radial clearance as shown, but two recesses 42 and 44 formed in the wall of the socket are sized to receive the projections 38 and 40, respectively, with only slight clearance. FIGS. 2 and 4 illustrate clearly the relative sizes and shapes of the recesses.

These recesses 42 and 44 are of substantially the same size and shape and are disposed axially opposite each other in the handle. They are so sized that only a slight amount of rotational movement of the spring 36 on the shaft 18 will result in the outer ends of the detents 38, 40 abutting against the respective recesses, thereby stopping further rotational movement thereof. In a working embodiment of this invention, relative rotation of no more than from 1° to 5° is needed before the abutting engagement occurs.

The recesses 42 and 44 are of such width that engagement with the walls thereof by the detents also holds the spring 36 against endwise movement. Also, the spring 36 is of such length that it fits between the collar 30 and the washer 26 without any noticeable endwise movement.

Disposed in the radial space between the socket 12 and the spring 36 is a reversing control element or slider, indicated generally by the numeral 46. This slider 46 is an arcuately shaped plate as shown more clearly in FIGS.

2, 3 and 4 which conforms almost precisely to the shape of the outer periphery of spring 36. In the opposite ends of the slider 46 are provided two notches 48 and 50, respectively, having widths which just clear the respective detents 38 and 40 on the spring ends. As shown in FIG. 3, the notch 50 slidably straddles the dentent 40 with very little clearance. Also as shown in FIG. 3, the left-hand end of the slider 46 clears the projection 38.

A knob 52 fixedly secured to the outer surface of plate 46 projects radially outwardly through an elongated slot 54 in the handle 10. Slot 54 is elongated in the direction parallel to the axes of the handle 10 and shaft 18 and has a width which provides a sliding clearance for the knob 52. The length of the slot 54 is made such that when the slider 46 is positioned as shown in FIGS. 2 and 3, the knob 52 will bottom against the right-hand end of the slot 54 as shown in FIG. 1. By the same token, when the slider 46 is moved to its extreme leftward position, the knob 52 will engage the left-hand end of the slot 54 in which location the slot 48 will straddle the projection 38 and the right-hand end of the slider 46 will clear and be spaced leftwardly from the detent 40.

In operation, the slider 46 is normally positioned in locking relation with one or the other of the two detents 38 and 40. When the slider 46 is moved to the position illustrated in FIGS. 1, 2 and 3, the end coil on which detent 40 is carried is held against rotation with respect to handle 10. This results from the fact that the detent 40 is straddled by the notch 50 and the knob 52 is restrained against rotation with respect to the handle 10. Viewing the tool from the end shown in FIG. 4, when the shaft 18 is restrained against movement and handle 10 is attempted to be rotated in the direction of the arrow F (FIG. 4), the spring 36 will be caused to wrap around and grip the cylindrcal portion 22 and impart the handle rotation to shaft 18. However, opposite rotation of the handle 10 may be effected without rotating the shaft 18 by reason of the fact that spring 36 tends to unwind and does not grip the cylindrical portion 22.

By moving the slider 46 to the extreme leftward position as shown in FIGS. 1 through 3 so that the notch 48 locks over the detent 38, the corresponding end coil of the helical spring will be locked against rotation. By the same token, the right-hand end coil of the spring will be permitted to rotate a slight amount, depending upon the clearance between projection 40 and its recess 44. Now, rotation of the handle in a direction opposite to that indicated by arrow F of FIG. 4 will result in imparting rotation to the shaft 18 by reason of the fact that spring 36 will wrap more tightly onto the cylindrical portion 22 and will frictionally grip the same. By the same token, opposite rotation of handle 10 will reseult in releasing the spring 36 and no rotational force will be impaired to the shaft 18. Thus, depending upon which end position the knob 52 of the slider 46 is in will determine the direction in which the shaft 18 will be driven by reciprocatory rotational motion of the handle 10. By providing close sliding fits between the various parts, only slight rotation of the handle 10 will result in the gripping and corresponding rotation of the shaft 18.

In one working embodiment of this invention, the slider 46 is of a length just slightly smaller than the space between the two detents 38 and 40. Thus, when the knob 52 is centered in the slot 54, neither of the notches 48 and 50 will be engaged with the detents 38 and 40. In this position, the shaft 18 can be rotated in both directions relative to the handle 10 inasmuch as the two detents 38 and 40 will simultaneously engage the surfaces of the respective recesses, thereby preventing the spring from frictionally wrapping around and gripping the cylindrical portion 22 of the shaft. Thus, three different modes of operation of the tool are possible, two of these being the reverse operation of the shaft 18 by oscillatory rotation of the handle 10 and the third being the free rotation of shaft 18 with respect to the handle 10 when the slider 46 is centered.

Preferably, the handle 10 is fabricated of a suitable plastic, such as nylon, while the remaining parts of the mechanism are made of metal. The tool may be used either as a wrench or screwdriver, and the operating principles of this invention have application beyond the hand tool art as will appear obvious to a person skilled in the art.

While there have been described above the principles of this invention in connection with specific apparatus, it is to be clearly understood that this description is made only by way of example and not as a limitation to the scope of the invention.

What is claimed is:

1. A reversible friction drive device comprising a support, a cylindrical drive member having an axis and mounted in said support for rotation about said axis, a helical spring positioned between said support and said drive member, said spring being coaxial with respect to said drive member and circumferentially slidable along its entire length with respect to said drive member, said spring having opposite end portions, the fit between said spring and drive member being such that when one end portion of said spring is held against relative movement with respect to said support said drive member will be engaged by said one end portion of said spring and will be held by said spring against rotation in one direction but will be rotatable in the opposite direction, detent means provided on said opposite end portions respectively of said spring, and reversing means mounted on said support for relative movement with respect to said spring and being selectively engageable with the detent means to lock a selected end portion of said spring against rotation with respect to said support, whereby said drive member may be alternatively locked against rotation in one direction by manipulation of said reversing means.

2. The device of claim 1 wherein said support includes a handle and said reversing means includes a control element having opposite ends and which is slidable relative to said spring, said element having locking portions on said opposite ends respectively which are engageable, respectively, with the detent means on the end portions of said spring.

3. The device of claim 2 including a socket in said handle, said cylindrical member being disposed inside said socket, said spring having opposite end coils, each end coil having a detent thereon, each locking portion on said control element being selectively engageable with a respective one of said detents to hold the corresponding end coil against rotation, and means on said handle for guiding said control element for rectilinear movement only.

4. The device of claim 3 including a shaft element which coaxially carries said cylindrical member thereon, said shaft element having portions journaled for rotation in said handle, said detents each including radial projections on said end coils respectively, and said locking portions on said control element including notches individually engageable with said projections, respectively, to lock selectively said end coils against rotation.

5. The device of claim 4 wherein said control element is an arcuately shaped plate slidably mounted on said spring, said spring being of uniform outer diameter and said plate having a shape conforming to a portion of the outer periphery of said spring, said handle having a slot therein which extends parallel to the axis of said cylindrical member, said plate having a knob thereon which projects with sliding clearance into said slot, said plate being disposed between the end projections on said end coils.

6. The device of claim 5 wherein the length of said plate is such that when one notch engages one projection the remaining notch will be disengaged from the other projection.

7. The device of claim 5 wherein said handle has two confining recesses therein which receive, respectively, said two end coil projections, said recesses having wall portions engageable by said projections for limiting the axial movement of said spring, said recesses providing abutment surfaces engageable by said projections upon a predetermined degree of rotation of said spring relative to said handle.

8. The device of claim 7 wherein said handle is elongated parallel to the axis of said cylindrical member, said socket having opposite end walls operatively engaged by opposite end portions of said cylindrical member for holding said cylindrical member against axial movement, said spring being formed of spring wire of orthogonal cross-section, one end portion of said shaft element being of smaller diameter than said cylindrical member, said smaller end portion of said shaft element being journalled in said handle, and said shaft element having a shank portion which projects from said handle.

References Cited

UNITED STATES PATENTS

| | | | |
|---|---|---|---|
| 1,704,062 | 3/1929 | Starkey | 145—76 |
| 2,024,947 | 12/1935 | Racklyeft | 192—47 X |
| 2,415,050 | 1/1947 | Starkey | 192—43 |
| 2,595,213 | 4/1952 | Rayner | 192—43 X |
| 3,067,626 | 12/1962 | Doerries et al. | 192—43 X |

BENJAMIN W. WYCHE, III, *Primary Examiner.*